United States Patent Office 3,398,168
Patented Aug. 20, 1968

3,398,168
PI-ALLYL PALLADIUM COMPLEX PRODUCTION
Dirk Medema, Amsterdam, Netherlands, assignor to Shell
Oil Company, New York, N.Y., a corporation of
Delaware
No Drawing. Filed Aug. 9, 1965, Ser. No. 478,412
Claims priority, application Netherlands, Mar. 17, 1965,
6503362
6 Claims. (Cl. 260—429)

ABSTRACT OF THE DISCLOSURE

An improved process of producing π-allyl palladium complexes comprises contacting a palladium (II) salt and an allylic compound with a hydrocarbon olefin in alcoholic solution.

---

This invention relates to an improved method for the production of certain palladium complexes incorporating organic ligands.

Numerous complexes of palladium containing one or more complexing ligands are known in the art. Such complexes have gained increased importance as catalysts for reactions of olefins and other unsaturated organic molecules, for example, processes of oligomerization or oxonation. One class of organic ligand-palladium complexes, herein termed π-allyl palladium complexes, is characterized by complex formation between a palladium moiety and an allylic moiety of an organic ligand as is illustrated by the following formula

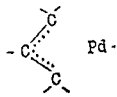

wherein the dotted line designation represents a delocalized electron system between the three indicated carbon atoms, which delocalized system is considered to at least partially donate electrons to the palladium moiety thereby forming the π-allyl complex. The palladium is additionally bonded to another moiety, e.g., an anion such as chloride or bromide, and the complex is considered to exist in the form of a dimer. In terms of the class of π-allyl palladium chloride complexes, the simplest member is π-allyl palladium chloride which is represented by the formula

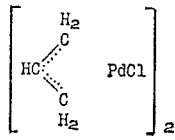

and is given the systematic name of di-μ-chloro-di-π-allyl dipalladium.

In general, π-allyl palladium complexes are produced by reduction of a mixture of a palladium salt and an allylic compound, i.e., an ethylenically-unsaturated organic molecule substituted on a carbon atom alpha to the ethylenic linkage with a non-hydrocarbyl substituent. The reduction is normally conducted at an elevated temperature employing an alcohol as the reducing agent. Under the vigorous reaction conditions customarily employed, the yield of π-allyl complex is not high.

It would be of advantage to provide an improved method for the production of π-allyl palladium complexes and this is an object of the present invention. More particularly, it is an object of the present invention to provide a method for the production of π-allyl palladium complexes under reaction conditions which are comparatively mild, thereby providing increased yields of the desired palladium complex.

It has now been found that these objects are accomplished by the process of contacting a palladium salt and an allylic compound with a hydrocarbon olefin in alcoholic solution, optionally in the presence of other metal salt. The utilization of olefin in the process of the invention enables milder reaction conditions to be employed and yet obtain comparatively high yields of the π-allyl complex.

The palladium salt precursors of the π-allyl palladium complexes are palladium (II) salts wherein the palladium is chemically combined with one or more anions. Illustrative palladium salts include palladium sulfate, palladium nitrate, palladium carbonate, palladium acetate and the like; however, preferred palladium salts are palladium halides, particularly palladium halides wherein the halogen is halogen of atomic number from 17 to 35 inclusive, i.e., the middle halogens chlorine and bromine. Particularly preferred as the palladium precursor of the complexes of the invention is palladium chloride.

The process is conducted in the optional presence of other metal salt, particularly a salt of a metal of Group I-A or Group II-A of the Periodic Table, i.e., a salt of alkali metal or alkaline earth metal, with one of the above-indicated anions, which salts are soluble in the reaction medium. Best results are obtained in the modification where Group I-A–II-A metal salt is present when the added salt is a metal halide, particularly a Group I-A–II-A metal chloride or bromide, as illustrated by sodium chloride, potassium bromide, magnesium chloride, lithium chloride, calcium chloride, barium bromide and the like. As previously stated, no added salt is required, but when present, molar amounts of Group I-A–II-A metal salt of up to twice the molar amount of palladium salt are satisfactory. When added salt is employed, alkali metal salts, particularly sodium salts, are the more suitable, especially sodium chloride. The added salt, when employed, and the palladium salt are added to the reaction mixture separately or alternatively are added jointly in the form of a coordination complex, e.g., a coordination complex such as sodium chloropallidate, $Na_2PdCl_4$.

The allylic compounds employed in the process of the invention comprise an organic compound of at least three carbon atoms having an ethylenic linkage, i.e., a nonaromatic carbon-carbon double bond, between two carbon atoms thereof with at least one hydrogen substituent of a carbon atom alpha to the ethylenic linkage having been replaced by a substituent which is non-hydrocarbyl, e.g., a substituent such as halo, cyano, acyl, hydroxy, alkoxy, mercapto, oxo, mercaptoalkyl, carboalkoxy and the like. Exemplary allylic compounds of this class include allyl chloride, allyl bromide, crotyl chloride, 1,4-dichlorobutene-2, allyl methyl ether, allyl acetate, allyl cyanide, 3,4-dichlorobutene-1, 1-chloro-4-methoxybutene-2, mesityl oxide, chloroprene, 2-chloropentene-3, 3-chlorocyclopentene, 3-chlorocyclohexene and 3-methoxycyclooctene. Preferred allylic compounds have from 3 to 8 carbon atoms, have a single carbon-carbon double bond as the only unsaturation present within the molecule, and are acyclic allylic compounds of only atoms of carbon and hydrogen besides a single non-hydrocarbyl substituent on one carbon atom alpha to the ethylenic linkage, which substituent is chloro, bromo, hydroxy, alkoxy of up to 4 carbon atoms or alkanoyloxy of up to 4 carbon atoms. Particularly preferred are allylic compounds of the latter class of from 3 to 5 carbon atoms wherein the alpha-carbon substituent is chloro or hydroxy and best results are obtained when allyl chloride is employed as the allylic compound.

The molar ratio of palladium compound to allylic compound to be employed is not critical and molar ratios of from about 4:1 to about 1:10 are satisfactory. Preferred are molar ratios of palladium compound to allylic compound from about 2:1 to 1:8.

The palladium compound and the allylic compound are contacted in an alcoholic reaction medium. The role of the alcohol in the process of the invention is not understood with certainty, but it is considered likely that the alcohol serves as a reducing agent as well as a reaction solvent and accordingly is employed in molar excess over the palladium compound or allylic compound. The optimum ratio of alcohol to palladium compound does not appear to be critical so long as the alcohol is present in molar excess thereover. Molar ratios of alcohol to palladium salt of from about 40:1 to about 150:1 are satisfactory with molar ratios of from about 60:1 to about 100:1 being preferred. The alcohol is preferably an acyclic primary alcohol of up to 8 carbon atoms which is free from carbon-carbon unsaturation. Illustrative of such primary alkanols are methanol, ethanol, propanol, butanol, isobutanol, 2-ethylhexanol and n-octanol. Preferred alkanols are primary, straight-chain alkanols of up to 4 carbon atoms and best results are obtained when methanol is utilized.

The alcohol is employed alone or in conjunction with other solvents or diluents, for example, hydrocarbons such as isooctane and hexane; ketones such as acetone and methyl ethyl ketone; ethers such as dimethoxyethane and tetrahydrofuran; and nitriles such as acetonitrile and propionitrile. The preferred reaction medium, however, comprises the primary alkanol as above defined optionally employed in conjunction with water. Aqueous alcoholic solutions of up to about 10 moles of water per mole of palladium salt are satisfactory, especially aqueous alcoholic reaction media of up to about 8 moles of water per mole of palladium compound. As previously stated, the presence of water is not required as the process is suitably conducted in the substantial absence of water.

The process of the invention comprises contacting the palladium compound, the allylic compound, whatever added salt if any is employed, and the alcoholic reaction medium with a lower hydrocarbon monoolefin. The presence of the olefin serves to promote the formation of the desired $\pi$-allyl complex, as substantially higher yields of the complex are obtained in the presence of the olefin than are obtained when olefin is not present, the reaction conditions being otherwise the same. Although acyclic hydrocarbon monoolefins of up to 6 carbon atoms or more are satisfactory, e.g., olefins such as propylene, butylene, 2-butene, isobutylene, hexene, 2,3-dimethylbutene-2, and the like, best results are obtained when ethylene is employed as the hydrocarbon olefin. The olefin is employed in amounts at least equimolar with the palladium compound. Although no apparent detriment arises through utilization of larger amounts of olefin, amounts up to about 10 moles of olefin per mole of palladium compound are satisfactory.

The process of the invention is conducted by contacting the reactants and reaction medium and maintaining the reaction mixture at a suitable temperature and pressure. The method of mixing is not material. In one modification, the palladium compound, the allylic compound, whatever added salt is employed and the alcoholic reaction medium are charged to a reactor and a hydrocarbon olefin is added thereto in increments as by bubbling a gaseous olefin into the reaction mixture. In an alternate modification, one or more additional reaction mixture components are added incrementally to the remaining components. In yet another modification, the process is conducted in continuous manner as by contacting the reactants during passage through a tubular reactor. In any modification, relatively mild reaction conditions are employed. Reaction temperatures of from about 0° C. to about 50° C. are satisfactory and good results are customarily employed when ambient temperature is utilized, e.g., about 20-30° C. Reaction pressures that are atmospheric, subatmospheric or superatmospheric are satisfactory, although little advantage is gained through utilization of reaction pressures other than atmospheric and reaction pressures that are substantially atmospheric are preferred. It is also preferred to conduct the process in a substantially inert environment. Thus, inert gaseous diluents such as nitrogen, argon, helium and the like may be present in the reaction system without adverse effect, but gaseous materials such as oxygen, carbon dioxide and carbon monoxide and other materials which are known to react with the palladium compound and/or organic reaction mixture components under the conditions of the reaction are preferably excluded. In the preferred modification of the process of the invention, no added gaseous diluent is employed.

Subsequent to reaction, the product mixture is separated and the desired $\pi$-allyl palladium complex is recovered by conventional methods such as by fractional distillation, selective extraction, selective crystallization and the like.

The process of the invention results in the efficient production of isolable $\pi$-allyl complexes of palladium, which complexes have established utility as catalysts for a variety of organic reactions. In some applications wherein a $\pi$-allyl palladium complex is employed as catalyst, the complex may be prepared in situ from palladium salts and allyl compounds added to the reaction mixture. Such in situ methods have the attendant disadvantages of a limited capability for providing catalyst, due to the comparatively low solubility of palladium salts in many reaction systems, and additionally has the disadvantage of providing an uncertain quantity of catalyst due to the nonquantitative character of an in situ $\pi$-allyl complex production. Such disadvantages are largely overcome by the present method for the production and isolation of the $\pi$-allyl palladium complexes which are subsequently employed as catalysts in numerous applications.

To further illustrate the improved process of the invention, the following examples are provided. It should be understood that the details thereof are not to be regarded as limitations as they may be varied as will be understood by one skilled in this art.

EXAMPLE I

To a solution of 8.88 g. of palladium chloride, 4.9 g. of sodium chloride, 3 g. of water and 20 g. of allyl chloride in 150 ml. of methanol at ambient temperature was added ethylene (25° C. and 1 atmosphere) for 1 hour at the rate of 2.5 liters/hour. The resulting product mixture was poured into 1 liter of water and the aqueous solution was extracted five times with 200 ml. portions of chloroform. The extract was dried over anhydrous magnesium sulfate and the chloroform was evaporated at reduced pressure to yield a yellowish-brown residue which was then dissolved in benzene. Subsequent to percolation of the benzene solution through neutral alumina, the solvent was removed by distillation at reduced pressure to provide 5.6 g. of pure di-$\mu$-chloro-di-$\pi$-allyl dipalladium which represented a yield of 61% based on palladium chloride charged.

EXAMPLE II

The procedure of Example I was repeated except that a total of 6 g. of water was employed. The yield of $\pi$-allyl palladium chloride was 69% based on palladium chloride charged.

Similar results are attained when propylene is used in place of the ethylene of the above experiment.

EXAMPLE III

The procedure of Example I was repeated except that the stoichiometric amount of allyl chloride, 3.86 g., was employed and was added dropwise to the other components of the reaction mixture. The yield of di-$\mu$-di-$\pi$-allyl dipalladium, 4.1 g., was 44.5% based on the palladium chloride charged.

EXAMPLE IV

For purposes of comparison, the procedure of Example III was repeated, but without the addition of ethylene. The yield of the desired complex was 21% based on palladium chloride charged.

EXAMPLE V

The procedure of Example III was repeated, except that no sodium chloride was added to the reaction mixture. The yield of $\pi$-allyl palladium chloride complex was 1.2 g.

EXAMPLE VI

The procedure of Example III was repeated except that no water was added to the reaction mixture. The yield of $\pi$-allyl palladium chloride, 3.86 g., was 42% based on the palladium chloride charged.

EXAMPLE VII

When the procedure of Example III was repeated employing allyl bromide in place of allyl chloride, the yield of $\pi$-allyl palladium bromide was 1.1 g. Also obtained was 0.5 g. of bis($\pi$-allyl)tripalladium tetrabromide.

Similar results are obtained when ethanol is employed as the alcohol of the above experiment.

I claim:

1. The process of producing a $\pi$-allyl palladium complex by intimately contacting:
   (a) a palladium (II) salt,
   (b) up to about two moles per mole of said palladium salt of a Group I-A-II-A halide soluble in the reaction medium,
   (c) from about 0.25 mole to about 10 moles per mole of said palladium salt of an allylic compound of from 3 to 8 carbon atoms, of a single ethylenic linkage as the only carbon-carbon unsaturation and of a nonhydrocarbyl substituent on a carbon atom alpha to the ethylenic linkage,
   (d) from about 40 moles to about 150 moles per mole of said palladium salt of an acyclic primary alkanol of up to 8 carbon atoms,
   (e) up to about 10 moles of water per mole of said palladium salt, and
   (f) from about 1 mole to about 10 moles per mole of said palladium salt of hydrocarbon monoolefin of up to 6 carbon atoms,
in an inert environment at a temperature of from about 0° C. to about 50° C.

2. The process of producing a $\pi$-allyl palladium complex by intimately contacting:
   (a) palladium (II) halide wherein the halogen is halogen of atomic number from 17 to 35 inclusive,
   (b) up to about two moles per mole of said palladium halide of Group I-A-II-A metal halide wherein the halogen is halogen of atomic number from 17 to 35 inclusive,
   (c) from about 0.25 mole to about 10 moles per mole of said palladium halide of an allylic compound of from 3 to 8 carbon atoms, of a single ethylenic linkage as the only carbon-carbon unsaturation and of a single nonhydrocarbyl substituent on one carbon atom alpha to the ethylenic linkage, which substituent is chloro, bromo, hydroxy, alkoxy of up to 4 carbon atoms or alkanoyloxy of up to 4 carbon atoms,
   (d) from about 40 moles to about 150 moles per mole of said palladium halide of an acyclic primary alkanol of up to 4 carbon atoms,
   (e) up to about 10 moles of water per mole of said palladium halide, and
   (f) from about 1 mole to about 10 moles per mole of said palladium halide of the hydrocarbon monoolefin of up to 6 carbon atoms,
in an inert environment at a temperature of from about 0° C. to about 50° C.

3. The process of claim 2 wherein the palladium halide is palladium chloride.

4. The process of claim 2 wherein the hydrocarbon monoolefin is ethylene.

5. The process of claim 4 conducted in the substantial absence of water.

6. The process of producing $\pi$-allyl palladium chloride by intimately contacting:
   (a) palladium (II) chloride,
   (b) up to about 2 moles per mole of palladium chloride of sodium chloride,
   (c) from about 0.5 mole to about 8 moles of allyl chloride per mole of palladium chloride,
   (d) from about 40 moles to about 150 moles of methanol per mole of palladium chloride,
   (e) up to about 10 moles of water per mole of palladium chloride, and
   (f) from about 1 mole to about 10 moles of ethylene per mole of palladium chloride,
in an inert environment at a temperature of from about 20° C. to about 30° C.

References Cited

Smidt et al.: Angew. Chem., vol. 71 (1959), p. 284.

TOBIAS E. LEVOW, *Primary Examiner.*

A. P. DEMERS, *Assistant Examiner.*